Figure 1:
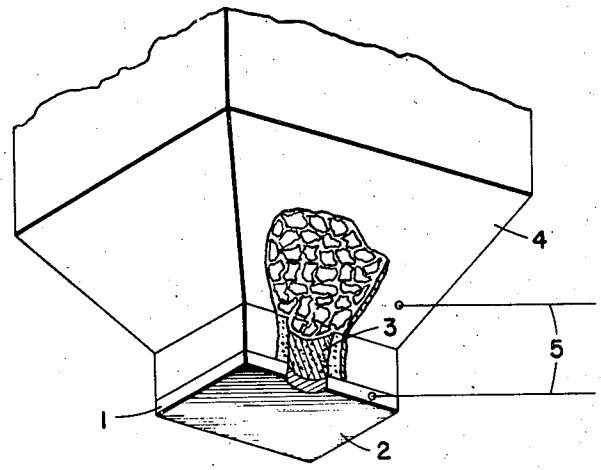
Figure 2:
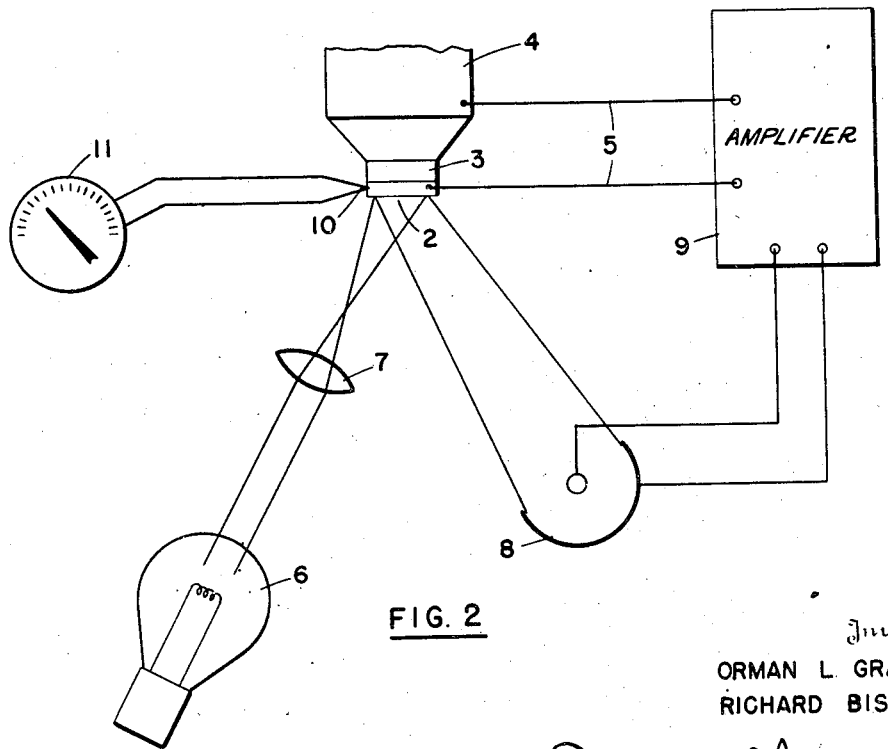

Patented Jan. 25, 1949

2,459,810

UNITED STATES PATENT OFFICE 2,459,810

DEW-POINT INDICATOR

Orman L. Graves, Santa Clara, and Richard Bishop, Palo Alto, Calif.

Application March 31, 1945, Serial No. 586,010

4 Claims. (Cl. 73—17)

(Granted under the act of March 3, 1883, as amended April 30, 1928; 370 O. G. 757)

This invention relates to a sandwiched-heater-type head for a mirror for photo-cell type dew-point indicator.

An object of this invention is to provide a means for regulating the temperature of a mirror for photo-cell type dew-point indicators.

A further object of this invention is to provide a mirror head heater for photo-cell type dew-point indicators that will automatically regulate the temperature of the mirror at the vapor saturation equilibrium temperature of the surrounding air or at the dew-point.

A still further object of this invention is to provide a mirror photo-cell type dew-point indicator that is more sensitive to small changes in dew-point and the time lag involved in responding to these changes is very small.

Other objects and advantages of this invention will become apparent as the description proceeds and is considered in connection with the claims and accompanying drawings wherein like characters of reference designate like parts in the several views and wherein:

Fig. I shows a partial perspective view of the heater head embodied in this invention and a mirror for a photo-cell type dew-point indicator.

Fig. II shows a schematic sketch of a mirror photo-cell type dew-point indicator with the heater head embodied in this invention adapted to the mirror.

Referring now to the drawings numeral 1 designates an electrically conductive mirror body, with a reflective face 2 forming the mirror proper. A heating element 3, here designated as a sandwiched-heater-type head, is composed of any suitable homogeneous material possessing both electrical and thermoresistivity of a considerable degree. The said heating element 3 is cohesively affixed to the mirror body 1 opposite the reflecting face 2. An electrically conductive cold element 4 of any conventional design and construction is cohesively affixed to the side of heating element 3 opposite the mirror body 1. Suitable electrical connections 5 are provided on both the cold element 4 and the mirror body 1. Electric current, passed from the mirror body 1 to the cold element 4 through the heating element 3, generates heat within the said heating element which in turn raises the temperature of the mirror body 1 and likewise the mirror surface 2. By disconnecting the electric current the cooling section of the cold element 4 causes the temperature of the heating element 3 to drop which in turn cools the mirror body 1 and the mirror surface 2. In this manner the temperature of the mirror surface 2 can be controlled to any degree desired.

In operation, referring now to Fig. II, light rays from a lamp 6 pass through a lens 7 and are reflected from the mirror surface 2 to a photo-cell 8 which controls the output of an electronic amplifier 9. Output current from the amplifier 9 is passed from the mirror body 1 through the sandwiched-heater-type head 3 to the cold element 4. The amount of heat generated within the sandwiched-heater-type head 3, and thence transmitted to the mirror body 1 and the reflector face 2, is determined by the intensity of the current passed through the said sandwiched-heater-type head 3. Dew or frost forming on the reflector face 2 disperses the flow of light rays reflected from the said reflector face 2 into the said photo-cell 8 to a degree dependent upon the thickness of the dew or frost accumulation on the said reflector face 2. The resulting action of the dispersed light rays upon the photo-cell 8 controls the output of current from the amplifier 9 passing through the said sandwiched-heater-type head thereby automatically maintaining the mirror body and reflecting surface at a controlled vapor saturation equilibrium temperature of the surrounding air or in other words at the dew-point.

A temperature sensitive element 10, such as a thermo-couple or resistance thermometer, used in conjunction with a suitable meter 11 indicates the temperature of the reflecting surface 2 to an observer.

The invention described herein may be manufactured and used by or for the Government of the United States of America for governmental purposes without the payment of any royalties thereon or therefor.

What we claim is:

1. A mirror head assembly for use in a photo-cell type dew-point indicator comprising an electrically conductive element having a reflecting surface, an electrically conductive element having cooling means, a heating element possessing both electrical and thermal resistivity sandwiched between and affixed to said conductive elements to constitute an integral assembly, and electrical connections for supplying current to said heating element.

2. A mirror head assembly for use in a photo-cell type dew-point indicator comprising an electrically conductive flat-faced element having a reflecting surface, an electrically conductive flat-faced element having cooling means, a flat-faced heating element possessing both electrical and thermal resistivity sandwiched between and cohesively affixed to the flat-faces of said conductive elements to constitute an integral assembly, the contiguous flat-faces of the first-mentioned element and said heating element being of coextensive area, and electrical connections for supplying electrical energy to said heating element.

3. In a dew-point-indicator having a source of light, a photo-cell and an amplifier electrically connected to said photo-cell; a mirror head assembly comprising an electrically conductive mirror element, an electrically conductive cold element, a heating element possessing both electrical and thermal resistivity sandwiched between and affixed to said mirror and cold elements to constitute an integral assembly, said cold and mirror elements being adapted for electrical connection to said amplifier to form an electrical circuit from said amplifier through said cold element, said heating element and said mirror element, whereby light from said source of light will be reflected from said mirror element to said photo-cell to control the flow of electricity from said amplifier through said heating element.

4. In a dew-point indicator having a source of light, a photo-cell, and an amplifier electrically connected to said photo-cell; a mirror head assembly comprising an electrically conductive mirror element, an electrically conductive cold element, and a heating element positioned between and in contact with said mirror and cold elements, said mirror and cold elements being electrically connected to said amplifier.

ORMAN L. GRAVES.
RICHARD BISHOP.

REFERENCES CITED

The following references are of record in the file of this patent:

UNITED STATES PATENTS

| Number | Name | Date |
|---|---|---|
| 1,883,116 | Tomlinson | Oct. 18, 1932 |
| 2,240,082 | Thornthwaite | Apr. 29, 1941 |
| 2,268,785 | Thornthwaite | Jan. 6, 1942 |

FOREIGN PATENTS

| Number | Country | Date |
|---|---|---|
| 317,306 | Great Britain | Aug. 12, 1929 |